United States Patent
Henmi et al.

(10) Patent No.: US 6,507,695 B2
(45) Date of Patent: Jan. 14, 2003

(54) DIGITAL INFORMATION SIGNAL RECORDING APPARATUS FOR RECORDING A DIGITAL INFORMATION SIGNAL TO A RECORD MEDIUM AND DIGITAL INFORMATION SIGNAL REPRODUCING APPARATUS FOR REPRODUCING A DIGITAL INFORMATION SIGNAL FROM A RECORD MEDIUM

(75) Inventors: Fumiaki Henmi, Kanagawa (JP); Tetsuo Kani, Kanagawa (JP); Yoshihiro Murakami, Kanagawa (JP); Takao Inoue, Kanagawa (JP); Shoji Kosuge, Kanagawa (JP); Minoru Kawahara, Kanagawa (JP); Makoto Toyoshima, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/044,731

(22) Filed: Mar. 19, 1998

(65) Prior Publication Data

US 2001/0046369 A1 Nov. 29, 2001

(30) Foreign Application Priority Data

Mar. 28, 1997 (JP) .............................................. 9-078504

(51) Int. Cl.[7] .............................. H04N 7/26; H04N 9/79
(52) U.S. Cl. .......................... 386/111; 386/35; 386/124
(58) Field of Search .............................. 386/95–96, 40, 386/37, 108–109, 111–112, 35, 124

(56) References Cited

U.S. PATENT DOCUMENTS

| | | | | | |
|---|---|---|---|---|---|
| 5,371,551 A | * | 12/1994 | Logan et al. | ................ | 386/112 |
| 5,530,598 A | * | 6/1996 | Arai et al. | ................... | 386/112 |
| 5,585,933 A | * | 12/1996 | Ichige et al. | ................ | 386/109 |
| 5,793,927 A | * | 8/1998 | Lane | ........................... | 386/81 |
| 5,831,174 A | * | 11/1998 | You | ............................ | 386/92 |
| 6,002,536 A | * | 12/1999 | Arai et al. | ................... | 386/112 |
| 6,009,227 A | * | 12/1999 | Inoue | .......................... | 368/52 |

* cited by examiner

Primary Examiner—Andrew Christensen
Assistant Examiner—Polin Chieu
(74) Attorney, Agent, or Firm—Frommer Lawrence & Haug LLP; William S. Frommer; Dennis M. Smid

(57) ABSTRACT

Input terminals to which two types of serial data with similar formats are sent are disposed. Video data sent to the normal dubbing input terminal is data that has not been compressed/encoded. Data sent to the straight dubbing input terminal is data that has been compressed and encoded. Data received from the input terminal includes a sync error flag (error flag for each sync block) that is OR output data of data added by a reproducing VTR and transmission error information. The sync error flag is sent to an ECC encoder through a format converter not through an BRR encoder. An output signal of an ECC encoder is recorded to a magnetic tape by recording heads through a recording driver.

4 Claims, 11 Drawing Sheets

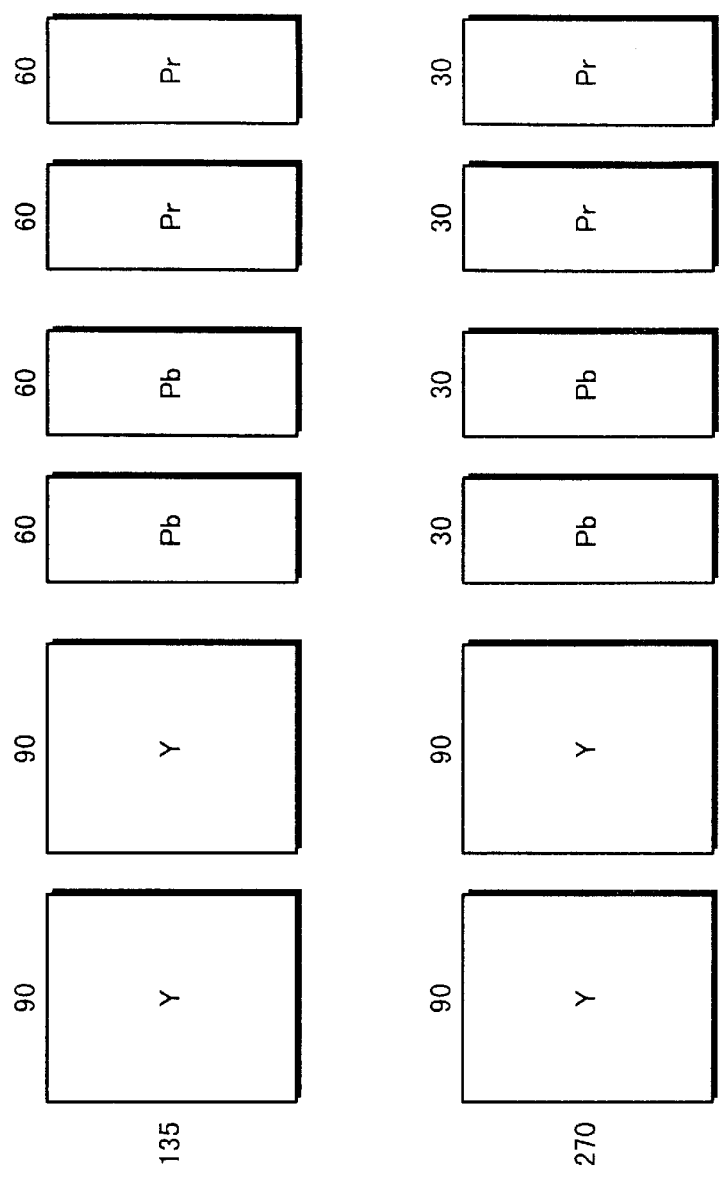

(4:4:4)SIGNAL,
(RGB),
74.25MHz (4:2:2)SIGNAL,
(y/pb/pr),
74.25MHz (3:1:1)SIGNAL,
(y/Pb/Pr),
55.6875MHz

ASIC I/F,
46.40625MHz

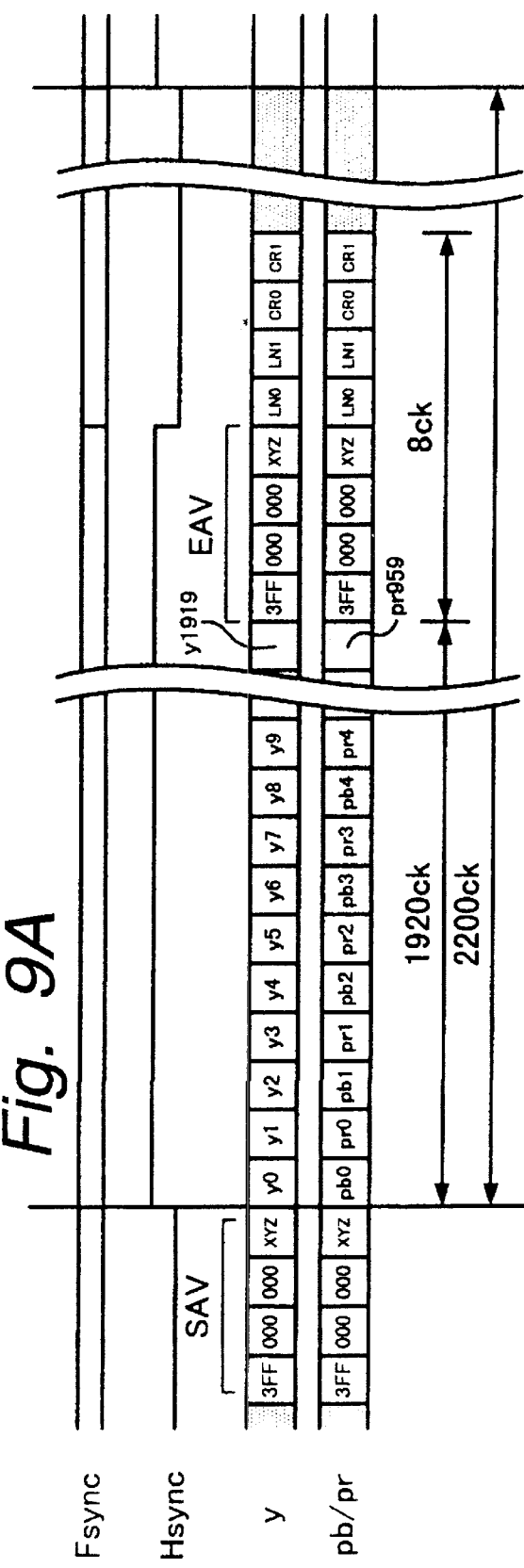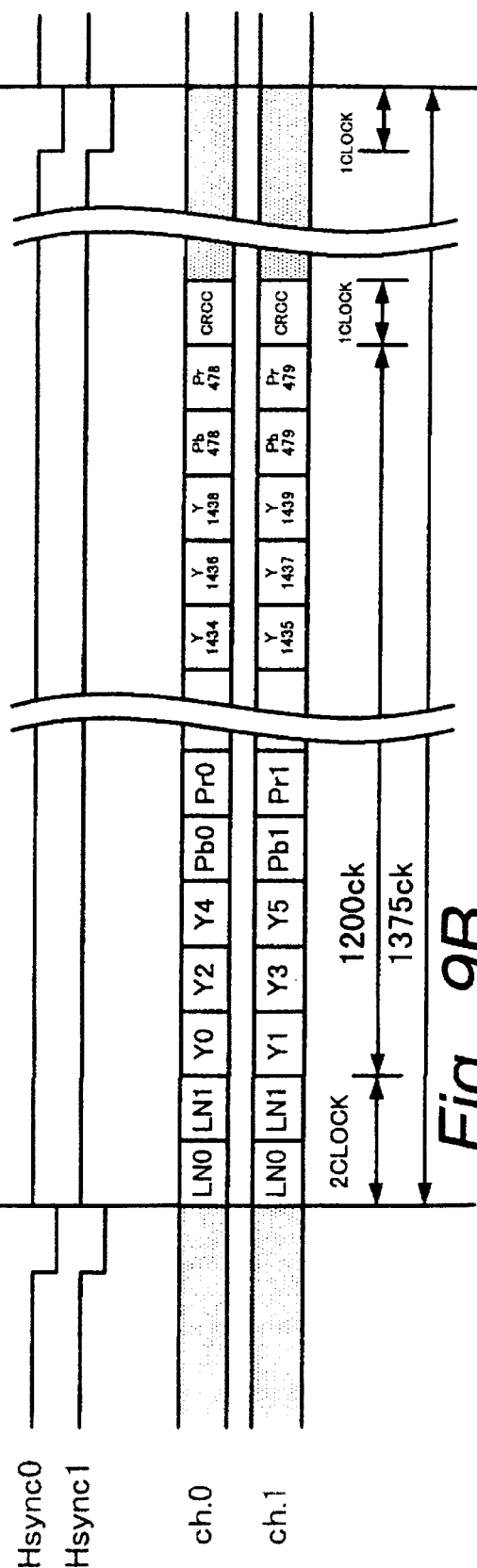

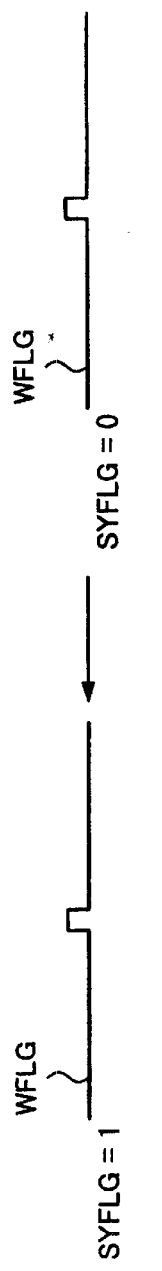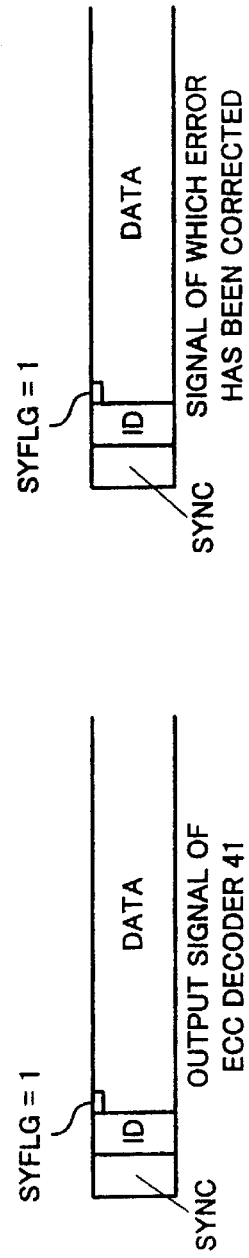
Fig. 12A
Fig. 12B

DIGITAL INFORMATION SIGNAL RECORDING APPARATUS FOR RECORDING A DIGITAL INFORMATION SIGNAL TO A RECORD MEDIUM AND DIGITAL INFORMATION SIGNAL REPRODUCING APPARATUS FOR REPRODUCING A DIGITAL INFORMATION SIGNAL FROM A RECORD MEDIUM

BACKGROUND OF THE INVENTION

1. Field of the Invention

The present invention relates to a digital information signal recording apparatus for recording a digital information signal such as a digital video signal and/or a digital audio signal to a record medium and to a reproducing apparatus for reproducing a digital information signal from a record medium.

2. Description of the Related Art

A signal processing apparatus that digitally processes a video signal (for example, a signal processing apparatus for use with a digital VTR (Video Tape Recorder) that records/reproduces a high resolution video signal) performs a picture compressing and encoding process for an input picture signal. The compressed and encoded video signal is recorded to for example a video tape.

With two digital VTRs, a signal reproduced by one VTR is recorded to a tape by the other VTR (namely, a dubbing process is performed). There are the following two dubbing methods. In the first dubbing method, after the amplitude, offset, and so forth of a reproduced video signal are processed, the resultant signal is recorded. In the second dubbing method, a reproduced signal is recorded without any process. Hereinafter, the first dubbing method is referred to as normal dubbing method (operation), whereas the second dubbing method is referred to as straight dubbing method (operation).

With conventional digital VTRs, the same terminal is used regardless of whether the normal dubbing process or the straight dubbing process is performed. In VTRs that compress/expand a picture signal, the reproducing VTR expands the picture signal and sends the resultant signal to the recording VTR. The recording VTR compresses the picture signal and then records the resultant signal to a tape. Generally, when a picture signal is compressed/expanded, it is difficult to completely restore the original signal. In other words, the original signal unavoidably deteriorates. Thus, even in the straight dubbing process, when it is repeated, the picture quality deteriorates.

OBJECTS AND SUMMARY OF THE INVENTION

Thus, an object of the present invention is to provide a digital information recording apparatus and a reproducing apparatus that suppress a signal that is dubbed from deteriorating.

To solve the above-described problem, the present invention is a digital information signal recording apparatus for recording a digital information signal to a record medium, comprising:

a first input terminal for inputting a digital information signal;

a first encoder for performing a compressing process for the digital information signal that is input through said first terminal;

a second encoder for performing an error correction code encoding process for a compressed signal received from said first encoder;

recording means for recording an output signal of said second encoder to a record medium; and a second input terminal for inputting data that has been compressed.

To solve the above-described problem, the present invention is a digital information signal reproducing apparatus for reproducing a digital information signal from a record medium, comprising:

reproducing means for reproducing a signal from a record medium;

a second decoder for performing an error correction code decoding process for a reproduced signal that is input from said reproducing means;

a first decoder for performing a decompressing process for an output signal of said second decoder;

a first output terminal for outputting a reproduced signal decompressed by said first decoder; and a second output terminal for outputting a reproduced and compressed signal that has not been not been decompressed by said first decoder.

The present invention is a data transmitting method for transmitting compressed data between an apparatus for reproducing a digital information signal from a record medium and an apparatus for recording a digital information signal to a record medium, comprising the step of:

providing compressed data with a portion for the error flag for each record/reproduction data block.

According to the present invention, since a terminal for a compressed signal of which a picture-compressing/expanding process is not performed is disposed, in the straight dubbing process, the deterioration of a picture quality can be minimized. In addition, since a terminal for the straight dubbing process (this terminal may be sometimes referred to straight dubbing terminal) is disposed, while the normal reproducing process is being performed, the straight dubbing process can be performed. Moreover, with a format of a signal sent through the terminal for the straight dubbing process, error information of data reproduced from a tape is sent. In addition, error information that takes place on a transmission path is left on a tape. Thus, the deterioration of the picture quality can be further suppressed.

The above, and other, objects, features and advantage of the present invention will become readily apparent from the following detailed description thereof which is to be read in connection with the accompanying drawings.

BRIEF DESCRIPTION OF THE DRAWINGS

FIG. 7 is a schematic diagram showing a block segmenting process of a BRR encoder;

FIGS. 9A and 9B are schematic diagrams showing formats of signals sent among each circuit (IC);

FIGS. 12A and 12B are schematic diagrams for explaining a process for an error flag according to an embodiment of the present invention.

DETAILED DESCRIPTION OF THE PREFERRED EMBODIMENTS

Figure 1:
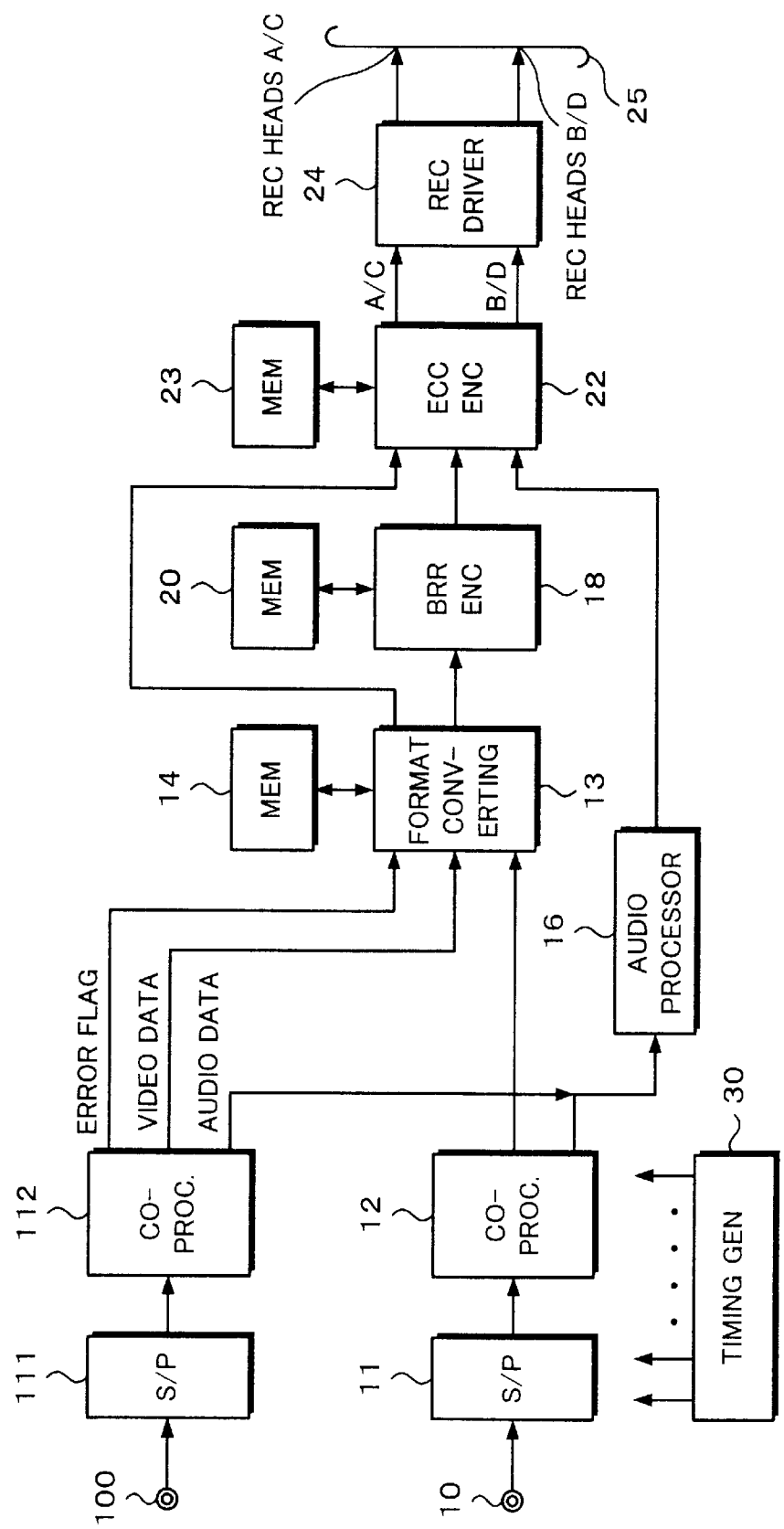
FIG. 1 is a block diagram showing an example of the structure of a recording system according to an embodiment of the present invention.
Figure 2:
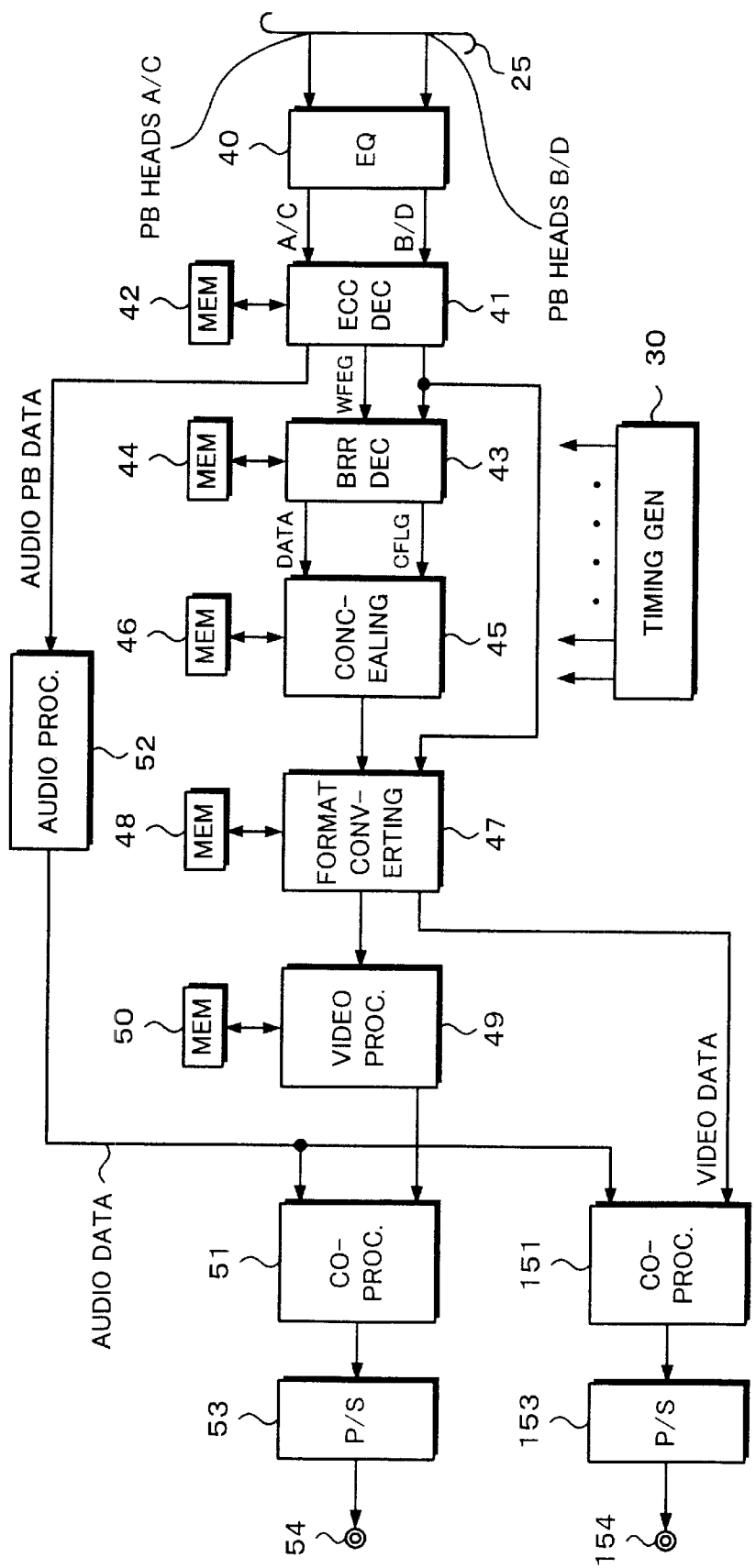
FIG. 2 is a block diagram showing an example of the structure of a reproducing system according to an embodiment of the present invention.

Next, with reference to the accompanying drawings, a digital VTR according to an embodiment of the present invention will be described. The digital VTR according to the embodiment of the present invention records a high resolution video signal and reproduces a high resolution video signal from a magnetic tape. FIG. 1 shows an example of the structure of the recording system. FIG. 2 shows an example of the structure of the reproducing system. In this embodiment, the recording system and the reproducing system are separately shown. However, a part of these systems may be shared. For simplicity, the normal recording process and the normal reproducing process rather than the straight dubbing process will be described.

Referring to FIG. 1, a serial digital A/V signal with a data rate of 1.485 Gbps (bits per second) corresponding to BTA S-004 standard is supplied to an input terminal 10. The serial digital A/V signal is sent to an S/P (serial to parallel) converter 11. The serial signal sent to the S/P converter 11 is converted into parallel data composed of a brightness signal Y and color difference signals Pr and Pb. Each of the brightness signal Y and color difference signals Pr and Pb is composed of for example eight bits. The data clock frequency of the parallel digital video signal is 74.25 MHz.

The parallel data is sent from the S/P converter 11 to a coprocessor 12. The coprocessor 12 is composed of for example one ASIC (Application Specific Integrated Circuit). The coprocessor 12 performs a process for auxiliary data and thereby separates a digital audio signal, a line number LN, and EAV from the serial data. The digital audio signal is sent to an audio processor 16. The coprocessor 12 performs a CRC checking operation with a CRC redundant code so as to determine whether or not an error takes place on the transmission line (namely, a transmission error). Alternatively, the CRC checking operation may be performed in a format converter 13 disposed in the next stage of the coprocessor 12.

An output signal of the coprocessor 12 is sent to the format converter 13. The format converter 13 performs a filtering process for compressing a (4:2:2) signal into a (3:1:1) signal. When the coprocessor 12 detects an error, the format converter 13 determines whether a connection point of a signal takes place with the continuity of successive line numbers. The format converter 13 compresses the band width of a signal. The format converter 13 is composed of for example one ASIC. A memory 14 is connected to the format converter 13. A timing generator 30 supplies clock signals with frequencies of 74.25 MHz and 46.40625 MHz to the format converter 13.

The format converter 13 converts the (3:1:1) signal into two-channel data. In FIG. 1, for simplicity, only one signal path is shown. In the circuits downstream of the format converter 13, data is processed for each channel. Data on each channel has a data rate of 46.40625 MHz. In each line, line numbers $LN_0$ and $LN_1$ are placed in channel data $Ch_0$ and channel data $Ch_1$, respectively.

The parallel (4:2:2) signal is converted into the signals $Ch_0$ and $Ch_1$ each of which has the brightness signal Y and the color difference signals Pr and Pb serially arranged. Thus, the clock frequency of 74.25 MHz can be decreased to 5/8 (namely, 46.40625 MHz). In addition, the brightness signal Y and the color difference signals Pr and Pb can be processed at the same clock frequency.

An output signal (two channels) of the format converter 13 is sent to a BRR (Bit Rate Reduction) encoder 18. A memory 20 is connected to the BRR encoder 18. The BRR encoder 18 performs a compressing and encoding process that is composed of for example a DCT (Discrete Cosine Transform) process, a quantizing process, and a variable-length code encoding process. In this example, it is assumed that the picture compressing rate is 1/4.4. The BRR encoder 18 shuffles DCT blocks.

The two-channel data that has been compressed and encoded by the BRR encoder 18 is sent to an ECC (Error Correction Code) encoder 22. In addition, the digital audio signal of which a particular process has been performed by the audio processor 16 is also sent to the ECC encoder 22. A memory 23 is connected to the ECC encoder 22.

Figure 10A:
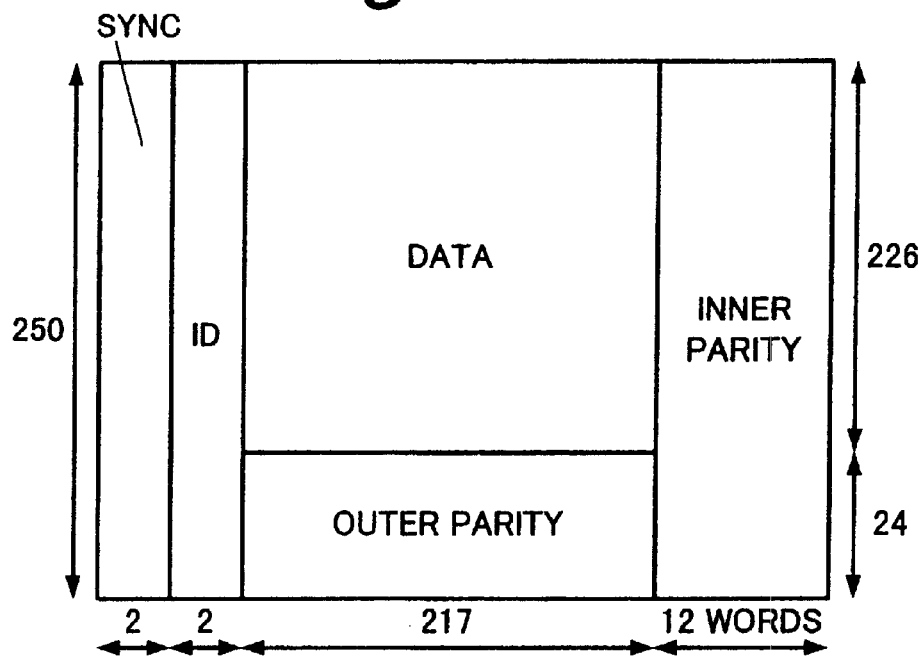
FIGS. 10A and 10B are schematic diagrams for explaining an error correction code.

The ECC encoder 22 encodes the digital audio signal with a product code (see FIG. 10A). Namely, the ECC encoder 22 encodes the digital audio signal with an outer code, adds an ID portion that includes a sync block number and various flags to each sync block recorded on a tape, and then encodes the resultant signal with an inner code. The range of the encoding process with the inner code includes the ID portion. One sync block includes the parity of the inner code and a sync signal that represents the top portion thereof. One sync block is the minimum data element that is recorded and reproduced.

An output signal of the ECC encoder is sent to a recording driver 24. Record data of one channel is sent from the recording driver 24 to magnetic heads A/C through a rotating transformer. Record data of the other channel is sent from the recording driver 24 to magnetic heads B/D through a rotating transformer. The record data is recorded on a magnetic tape 25.

The recording system has a timing generator 30 that supplies a system clock signal corresponding to an applied format such as 1125 lines/60 Hz format, 1125 lines/59.94 Hz format, or 525 lines/59.94 Hz format. Corresponding to the system clock signal, a clock signal necessary for the recording system is generated. The timing generator 30 is used in the reproducing system.

Next, with reference to FIG. 2, the normal process of the reproducing system will be described. Signals recorded on the magnetic tape 25 are reproduced by the reproducing magnetic heads A/C and B/D. Thus, two-channel reproduction signals are obtained. A reproduction signal A/C of one channel is sent to an equalizer 40. A reproduction signal B/D of the other channel is sent to the equalizer 40. The equalizer 40 is disposed for each channel. In addition, individual processes in the downstream stages of the format converter 47 are performed for each channel. The timing generator 30 is shared with the recording system.

Output signals of the equalizer 40 are sent to an ECC decoder 41. A memory 42 is connected to the ECC decoder 41. The ECC decoder 41 corrects an error of a signal received from the equalizer 40 with an inner code of an error correction code. The inner code is completed in one sync block. When an error can be corrected with the inner code, the ECC decoder 41 corrects the error. When an error cannot be corrected with the inner code, the ECC decoder 41 sets an error flag at the position of the error. Thereafter, the ECC decoder corrects an error of the signal with an outer code. With reference to the error flag, the ECC decoder 41 performs an erasure-correcting process for the error. Thus, most errors can be corrected. However, when a large error such as an error that takes place in the longitudinal direction of the tape, the ECC decoder 41 cannot correct the error. In this case, the ECC decoder 41 detects an error in the error detecting range of the outer code and sets a word error flag WFLG to the position of an error word. In other words, the word error flag WFLG is set for each symbol (in this case, each word).

The error correcting decoder 41 outputs data and word error flag WFLG as sync blocks corresponding to the clock signal of 46.40625 MHz. A sync error flag is placed in a header portion of each sync block (see FIG. 10B). An output signal of the error correcting decoder 41 is sent to a BRR decoder 43. The clock signal of 46.40625 MHz is supplied from the timing generator 30 to the BRR decoder 43. The BRR decoder 43 performs an inverse DCT converting process and a deshuffling process with a memory 44 and decodes the compressed signal.

An output signal of the BRR decoder 43 is sent to a concealing circuit 45 along with the conceal error flag CFLG. The concealing circuit 45 is composed of for example one ASIC. A memory 46 is connected to the concealing circuit 45. The concealing circuit 45 conceals an error that the ECC decoder cannot correct (such as a large error due to a scratch on the magnetic tape 4) in the reproduction signal. For example, the concealing circuit 45 interpolates in a predetermined manner an error portion that has not been corrected. For example, the BRR decoder 43 determines an error of a DCT coefficient corresponding to the word error flag WFLG. When a DC coefficient or a low order AC coefficient that is a relatively important coefficient has an error, the BRR decoder 43 does not decode such a DCT block. In this case, the BRR decoder 43 sends the conceal flag CFLG to the concealing circuit 45. The concealing circuit 45 interpolates the relevant DCT block.

An output signal of the concealing circuit 45 is sent to a format converter 47. The format converter 47 suppresses irregular noise that takes place in the picture compressing/expanding process performed in the BRR decoder 43 or the BRR encoder of the recording system. The noise suppressing process is performed with a memory 48 connected to the format converter 47 corresponding to the clock signal of 46.40625 MHz.

The format converter 47 receives the clock signals of 46.40625 MHz and 74.25 MHz from the timing generator 30. The format converter 47 converts the two-channel signals into a (4:2:2) signal corresponding to the clock signals with the memory 48. The format converter 47 adds a line number to the converted signal. The format converter 47 sends the resultant signal with a data rate of 74.25 MHz to a video processor 49.

A memory 50 is connected to the video processor 49. The video processor 49 adjusts a gain, an offset, and so forth of the received video signal. An output signal of the video processor 49 is sent to a coprocessor 51. In addition, reproduced audio data is sent from the audio processor 52 to the coprocessor 51. The audio data is decoded with an error correction code by the ECC decoder 41 and then sent to the audio processor 52. The audio processor 52 performs a particular process for the audio signal and sends the resultant signal to the coprocessor 51.

The coprocessor 51 places the digital audio signal in the (4:2:2) signal corresponding to the clock signal of 74.25 MHz and adds predetermined auxiliary data corresponding to the relevant format to the resultant signal. For example, the coprocessor 51 performs a CRC calculation for each line of the resultant signal and generates a CRC code. With the CRC code, a transmission error can be detected. An output signal of the coprocessor 51 is sent to a P/S (Parallel to Serial) converter 53. The P/S converter 53 converts the parallel signal into a serial digital A/V signal with a data rate of 1.485 Gbps. An output signal of the P/S converter 51 is sent as reproduced serial data to an output terminal 54. In the normal dubbing process, serial data received from the output terminal 54 is sent to the input terminal 10 of the recording VTR.

In the structure of the reproducing system, an interface signal sent from the BRR decoder 43 to the format converter 47 (composed of relevant ASICs) is processed in the same format and corresponding to the same clock signal (46.40625 MHz). Line numbers $LN_0$ and $LN_1$ are added to the two-channel output signal of the BRR decoder 43. The signal with the line numbers $LN_0$ and $LN_1$ is sent to the downstream circuits. Thus, even if the continuity of the line numbers is lost, a relevant error can be easily detected.

Figure 3:
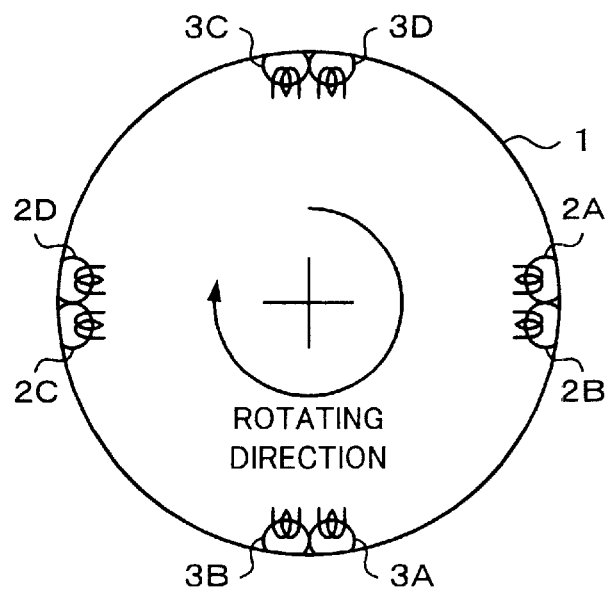
FIG. 3 is a schematic diagram showing an arrangement of heads.
Figure 4:
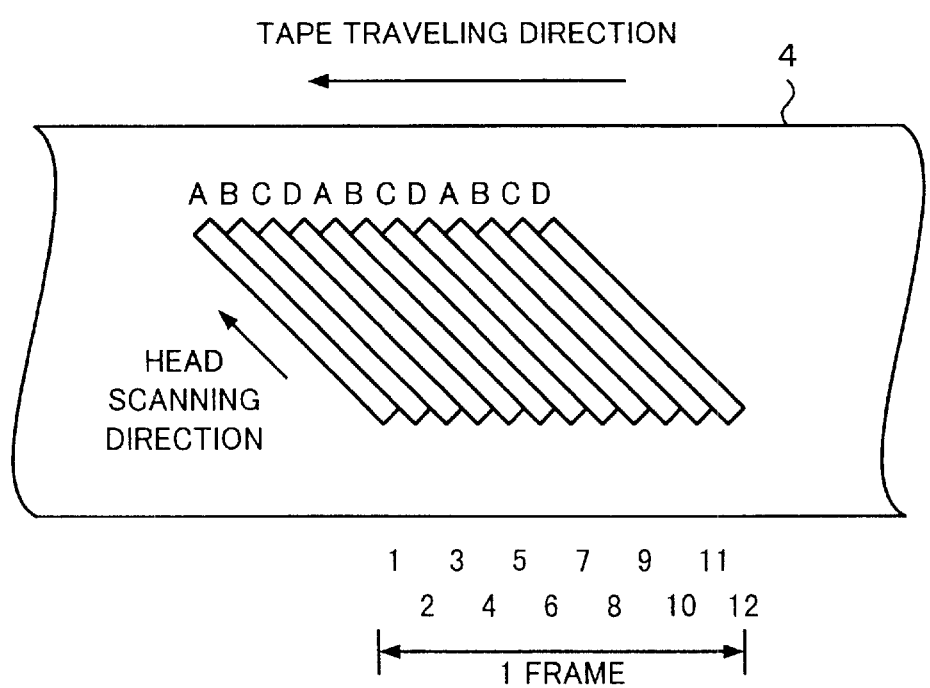
FIG. 4 is a schematic diagram showing a track format of a magnetic tape.

FIG. 3 shows an arrangement of rotating heads. FIG. 4 shows a track pattern on a magnetic tape. As shown in FIG. 3, four recording magnetic heads 2A, 2B, 2C, and 2D are disposed on a rotating drum 1 that rotates at for example 90 Hz. Double azimuth heads are used so that the magnetic heads 2A and 2B are adjacently disposed. The magnetic heads 2A and 2B are composed of a double azimuth head so that they are adjacently disposed. Likewise, the magnetic heads are adjacently disposed. The azimuth angles of the magnetic heads are different from each other. Likewise, the azimuth angles of the magnetic heads 2C and 2D are different from each other. The magnetic head 2A is disposed opposite to the magnetic head 2C (namely, with an angle of 180°). The magnetic head 2C is disposed opposite to the magnetic head 2D (namely, with an angle of 180°).

A magnetic tape is wound around the rotating drum 1 with a winding angle of 180°. The magnetic heads and the signal systems are switched so that a record signal is sent and a reproduction signal is obtained while the magnetic heads are tracking the magnetic head. A point at which the magnetic heads and the signal systems are switched is referred to as a switching point. Now, assuming that tracks corresponding to the heads are denoted by A, B, C, and D, as shown in FIG. 4, the magnetic heads 2A and 2B form the tracks A and B at the same time. In addition, the magnetic heads 2C and 2D form the tracks C and D at the same time.

A segment is composed of a pair of two adjacent tracks (a pair of A and B channels and a pair of C and D channels) that have different azimuth angles. One frame (1/30 second) of a video signal is composed of 12 tracks. Thus, one frame of a video signal is composed of six segments. Six segments are designated segment numbers 0 to 5. Audio data of four channels is recorded at a center portion of each track so that the audio data is sandwiched by video data.

Reproducing magnetic heads 3A, 3B, 3C, and 3D are also disposed on the magnetic drum 1. The relation of the arrangement and azimuth angles of the reproducing magnetic heads 3A, 3B, 3C, and 3D is the same as the relation of those of the recording magnetic heads 2A, 2B, 2C, and 2D.

Figure 5:
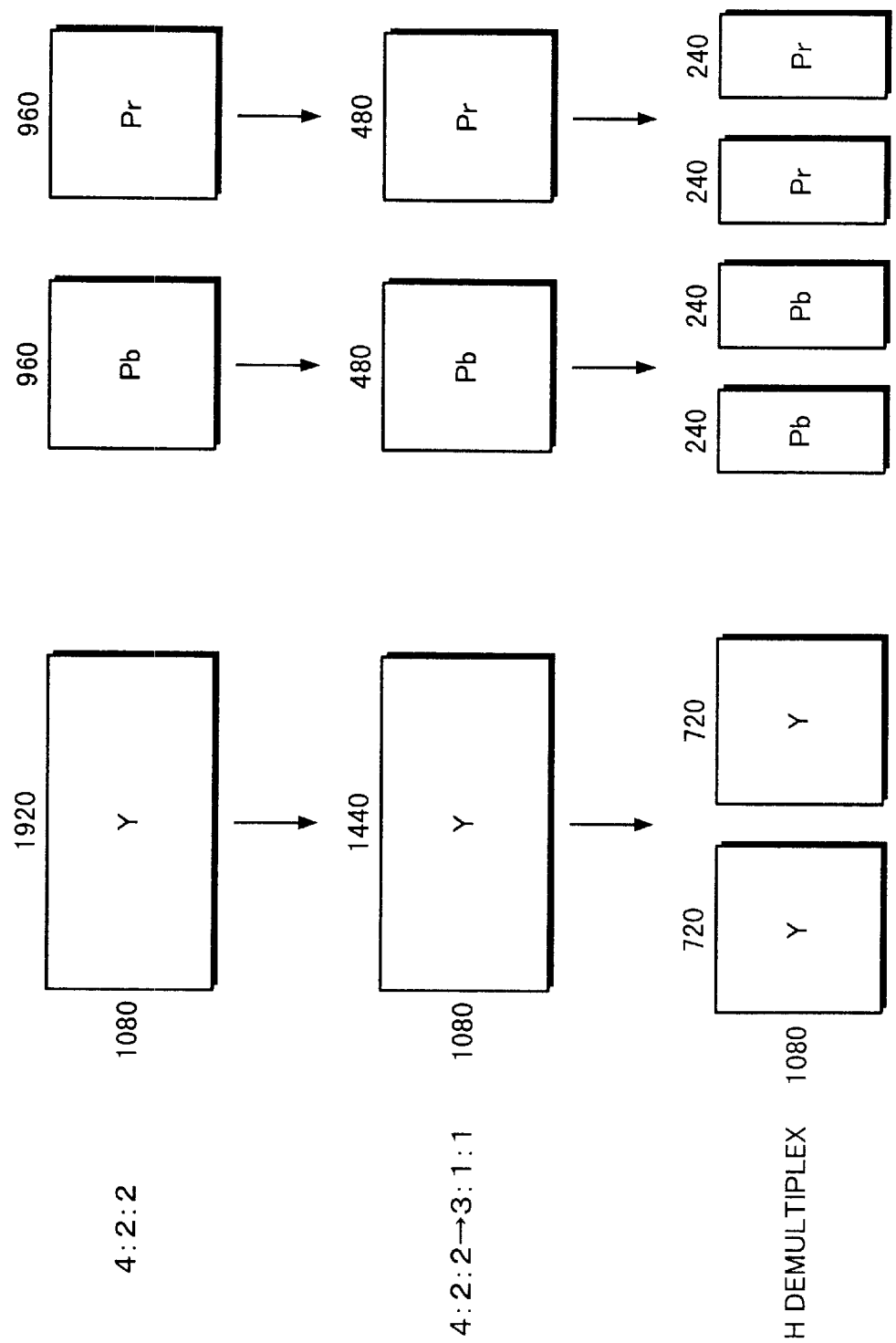
FIG. 5 is a schematic diagram showing a data compressing process according to an embodiment of the present invention.

FIG. 5 is a schematic diagram showing a compressing process for compressing the amount of data of a high resolution video signal according to an embodiment of the present invention. For example, the high resolution video signal is a video signal photographed by a high resolution video camera using a CCD. The high resolution video signal is composed of RGB components of three primary colors. The high resolution signal is a (4:4:4) signal of which the ratio of the sampling frequencies of these components is 4:4:4. The RGB signal is converted into a component signal ((4:2:2) signal) composed of a brightness signal Y, a red color difference signal Pr, and a blue color difference signal Pb.

One frame of a signal photographed by a high resolution video camera is composed of 2200 H×1125 V pixels (where H represents the number of pixels in one line; and V represents the number of pixels in one frame). As represented by an upper portion of FIG. 5, the signal Y (brightness signal) of the (4:2:2) signal represents a valid area of the frame. The signal Y is composed of 1920 H×1080 V. Each of the signals Pr and Pb is composed of 960 H×1080 V. The (4:2:2) signal and digital audio signal are sent as serial data with a predetermined format to the input terminal 10 of the recording system. In this format, the audio data and additional data (error detecting CRC. line number, and so forth) are sent using other than the valid area.

Figure 6:
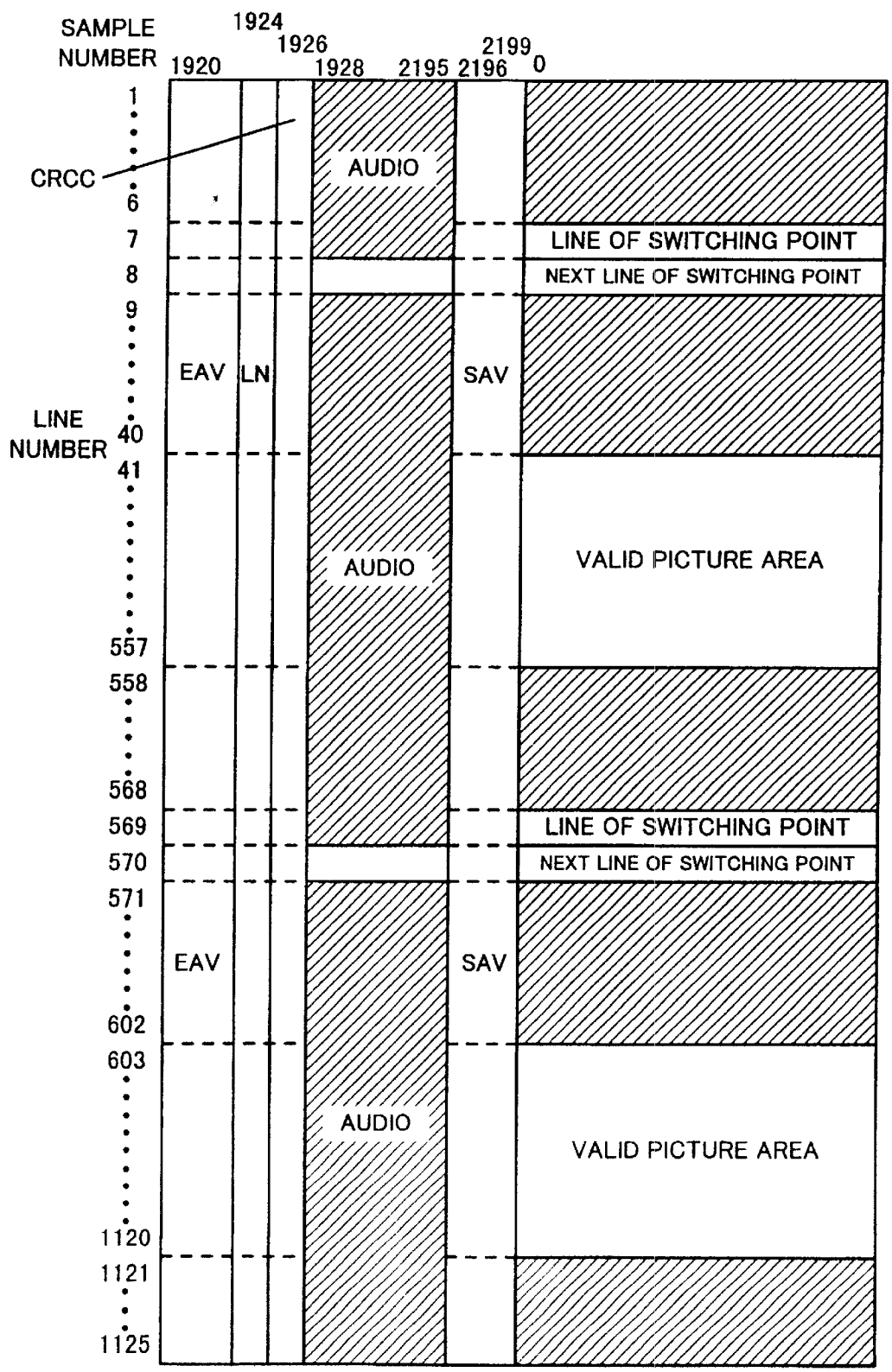
FIG. 6 is a schematic diagram showing a transmission format of a serial digital A/V signal.

FIG. 6 shows a serial digital A/V signal with a data rate of 1.485 Gbps corresponding to BTA S-004 standard that is an example of a transmission format of serial data. In FIG. 6, numbers in the vertical direction represent line numbers. Numbers in the horizontal direction represent sample numbers. Data is serially sent in the ascending order of line numbers and picture sample numbers. Picture data and audio data of one frame composed of 2200 samples in the horizontal direction and 1125 lines in the vertical direction are sent.

In the horizontal direction, 1920 samples from 0-th sample to 1919-th sample are samples in a valid picture area. In lines of other than a vertical blanking interval, a video signal is sent. SAV that represents the beginning of a valid picture area is placed from the 2196-th sample to the 2199-th sample. EAV that represents the end of a valid picture area is placed from the 1920-th sample to the 1923-rd sample. An audio signal is sent with 268 samples from the 1928-th sample to the 2195-th sample. A line number LN is placed in the 1924-th sample and the 1925-th sample. A check bit of CRCC (Cyclic Redundancy Check Code) of relevant lines is placed in the 1926-th sample and the 1927-th sample.

In the vertical direction, the 1-st line to 40-th line, the 558-th line to 602-nd line, and the 1121-st line to 1125-th lines are vertical blanking intervals. For example, a switching point of a helical scan type video head is placed in a vertical blanking interval. A video signal for one field is sent with the 0-th sample to 1919-th sample in the 41-st line to 557-th line and the 603-rd line to 1120-th line.

As shown in FIG. 6, an audio signal is sent in other than the next line of a switching point. In this format, data and signal out of the valid picture area in the horizontal direction is referred to as auxiliary data.

The format converting circuit 13 (see FIG. 1) converts a (4:2:2) signal into a (3:1:1) signal. As shown in FIG. 5, the signal Y of the (3:1:1) signal is composed of 1440 H×1080 V. Each of the signals Pr and Pb of the (3:1:1) signal is composed of 480 H×1080 V. In addition, the format converting circuit 13 perform a demultiplexing process (H-demultiplexing process) that separates the (3:1:1) signal into two channels in the horizontal direction. Thus, as represented by a lower portion of FIG. 5, the signal Y of each channel is composed of 720 H×1080 V. Each of the signals Pr and Pb of each channel is composed of 240 H×1080 V.

In the downstream circuits of the format converting circuit 13, individual processes are performed for two channels. The data rate of the serial data received from the input terminal 10 is 1.485 GHz. The S/P converter 11 converts the serial data into parallel data with a data rate of 74.25 MHz. The format converting circuit 13 outputs data with a data rate of 44.40625 MHz (=74.25 MHz×⅗) for each channel.

The BRR encoder 18 segments a signal of each channel with DCT blocks. The BRR encoder 18 has the field mode and the frame mode. In the field mode, the BRR encoder 18 forms DCT blocks in a field and performs the DCT encoding process for the DCT blocks. In the frame mode, the BRR encoder 18 forms DCT blocks in a frame and performs the DCT encoding process for the DCT blocks. The information that represents the field mode or frame mode is placed in the ID of each sync block. When the difference of pictures of the two fields of one frame is small (namely, the movement of a picture is small), the frame mode is selected. On the other hand, when the difference of pictures is large (namely, the movement of a picture is large), the field mode is selected. FIG. 7 shows a block segmenting process for DCT blocks in the frame mode and the field mode.

In the frame mode, a picture of one frame is divided into DCT blocks of (8 H×8 V) (Y) and (4 H×8 V) (Pr/Pb). Thus, as represented by an upper portion of FIG. 7, on each channel and in each frame, a (90×135) block (Y) and (60×135) blocks (Pr/Pb) are formed. When DCT blocks are shuffled, for DCT blocks (Pr/Pb), every two blocks are treated as a pair. Thus, when DCT blocks are shuffled, a (30×135) block (Pr/Pb) is formed.

On the other hand, in the field mode, a picture of one frame is divided into DCT blocks of (8 H×4 V) (Y, Pr/Pb). The number of lines of each DCT block is the half of that in the frame mode. This is because the length of one DCT block in the field mode is matched with that in the frame mode. Thus, as represented by a lower portion of FIG. 7, on each channel and in each frame, a (90×270) block (Y) and (30×270) blocks (Pr/Pb) are formed. In these structures of DCT blocks, DCT blocks are placed in different positions from the original positions in the frames. In other words, the DCT blocks are shuffled. Thus, the amount of data that has been compressed and encoded is averaged in DCT blocks.

Figure 8A:
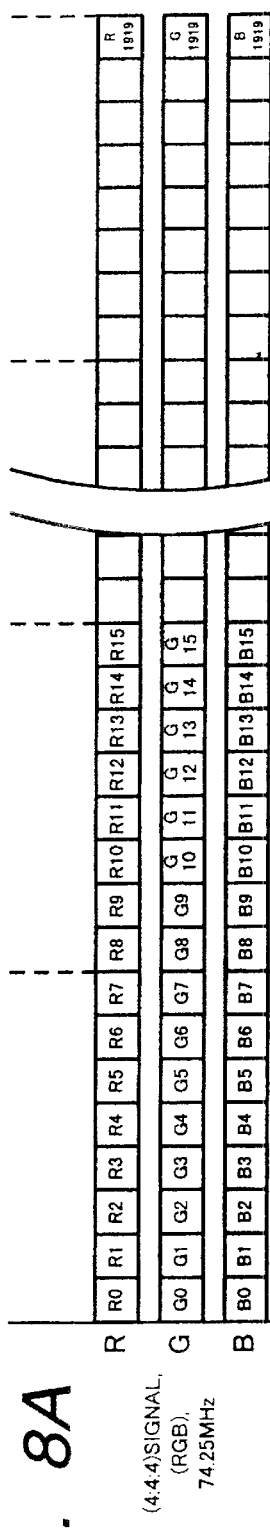
FIGS. 8A to 8D are schematic diagrams showing a data format in a compressing process according to an embodiment of the present invention.
Figure 8B:

Next, a data compressing process according to an embodiment of the present invention will be described with an example of the case that data of one line is compressed. For example, as shown in FIG. 8A, a video signal that is output from a CCD is a (4:4:4) signal of which a red signal R, a green signal G, and a blue signal B are sent in parallel. Each of the parallel signals has a data width of for example eight bits. One pixel is composed of a set of $R_n$, $G_n$, and $B_n$ signals. Thereafter, the (4:4:4) signal is converted into a (4:2:2) signal (see FIG. 8B). The (4:2:2) signal is supplied in the format of serial data shown in FIG. 6 from the input terminal 10. Data shown in FIG. 8B is output from the coprocessor 12 that decomposes the serial format.

Figure 8C:
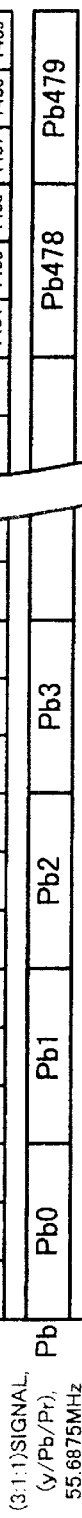
Figure 8D:
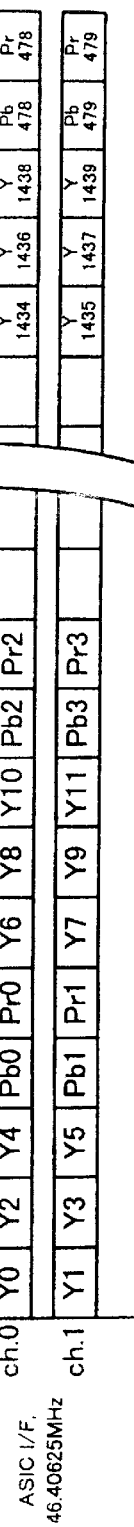

The format converting circuit 13 converts the (4:2:2) signal into a (3:1:1) signal (see FIG. 8C). The frequency of the clock signal of the (3:1:1) signal is 55.6875 MHz. In addition, as shown in FIG. 8D, the format converting circuit 13 converts the (3:1:1) signal into two-channel signals $Ch_0$ and $Ch_1$ of which the Y, Pr, and Pb signals are arranged in series. The frequency of the clock signal of the signals $Ch_0$ and $Ch_1$ is 46.40625 MHz (=74.25 MHz×⅝).

A line number LN is placed in each of the signal $Ch_0$ and $Ch_1$. The line number LN is sent to each structural portion along with data. When a signal is processed, the line number LN is referenced for controlling a memory address and a data order. Thus, even if the continuity of lines is lost due to a particular cause, data can be compensated in the order of line numbers.

For simplicity of the compressing process, FIG. 8 shows only video data (v, Pr/Pb).

FIG. 9A shows an example of a (4:2:2) with auxiliary data added by the coprocessor 12. A brightness signal Y is successively sent corresponding to the clock signal of 74.25 MHz. On the other hand, since the band widths of the color difference signals Pr and Pb have been compressed, the amount of data thereof is halved. For example, brightness signals $Y_0$ and $Y_1$ correspond to color difference signals $Pr_0$ and $Pb_0$, respectively. Brightness signals $Y_2$ and $Y_3$ correspond to color difference signals $Pb_1$ and $Pr_1$ respectively.

Corresponding to a Hsync signal received from the timing generator 30, SAV and EAV are placed at the beginning and the end of 1920 clock pulses that represent a valid picture area of the (4:2:2) signal for four clock pulses each. After EAV, line numbers $LN_0$ and $LN_1$ generated corresponding to a line number LN are placed. Afer the line numbers $LN_0$ and $LN_1$, CRC check bits $CR_0$ and $CR_1$ are placed. The CRC check bits are added so as to detect an error of data sent among each IC chip. Since the number of valid lines in the vertical direction is 1125, a line number LN can be represented by 11 bits.

FIG. 9B show two-channel data $Ch_0$ and $Ch_1$ that are output from the format converting circuit 13. The period of the valid data in the signal is included in the period of 1200 clock pulses. When a Hsync0 signal corresponding to the signal $Ch_0$ goes high, the Hsync0 signal represents the start of one horizontal interval. The line numbers $LN_0$ and $LN_1$ are placed for two clock pulses. Thereafter, the brightness signal Y and the color difference signals Pr and Pb are serially placed. After the brightness signal Y and the color difference signals Pr and Pb for one line, a CRC check bit is placed for one clock pulse. At the 1375-th clock pulse of the Hsync signal at the beginning of one horizontal interval, the next Hsync signal takes place.

In the straight dubbing process (that will be described later), data is sent in the format shown in FIGS. 9A and 9B. However, compressed and encoded video data is handled. Since data has been compressed, data for around 1.5 sync blocks is placed in one horizontal interval shown in FIGS. 9A and 9B.

FIG. 10A shows an example of the structure of an error correction code against video data. Video data in each track is encoded with an error correction code. In other words, video data for one track is arranged as 217×226 words. An encoding process is performed for 226 words (one word is equal to one byte) arranged in the vertical direction with (250, 226) Reed Solomon code (namely, an outer code). A parity of an outer code of 24 words is added. With the outer code, an error correction of up to 10 words can be performed. In addition, an erasure correction of up to 24 words can be performed.

An ID of two words is added to 217 words arranged in the horizontal direction of a two-dimensional array (video data or parity of an outer code). An encoding process is performed for (217+2=219) words arranged in the horizontal direction with (231, 219) Reed Solomon code (inner code). Thus, a parity of an inner code of 12 words is generated. With the inner code, for example, an error of up to four words is corrected. Alternatively, an erasure flag for correcting an error with an outer code is generated.

As with video data, audio data is encoded with a product code although the data amount of one track of the video data is different from that of the audio data.

Figure 10B:
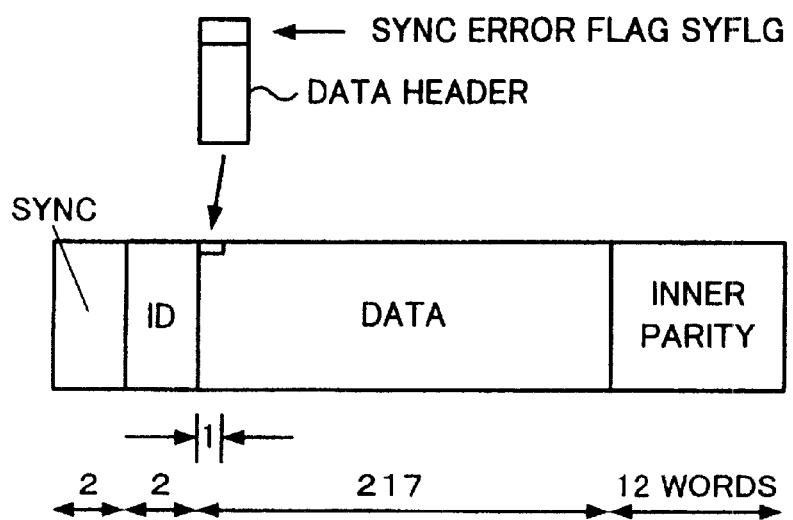

Data is encoded with an outer code. The resultant data with an ID is encoded an inner code. Data is cut in the encoding direction of the inner code. A block sync is added to the resultant data. Thus, one sync block is formed. In other words, a block sync of two words is added to (2+217+12=231) words of each line of the arrangement shown in FIG. 10A. FIG. 10B shows the structure of one sync block. On the magnetic tape, if necessary, data of successive sync blocks is digitally modulated and then recorded.

The ID of each sync block includes a segment number, a sync block number, and so forth. The first word of 217 words of each sync block is a data header. The data header includes information that represents a quantizing characteristic of data and a sync error flag of one bit. When data is recorded, the sync error flag is set to "0" that represents that no error takes place. When data is reproduced, as the result of the process of the ECC decoder 41, if a sync block of the data contains a small error of one word that has not been corrected, the error flag of the sync block is set to "1". The process of the error flag will be described later.

In the embodiment of the present invention, the straight dubbing process that allows the deterioration of the picture quality to be minimum can be performed. For simplicity, returning to FIG. 2, the structure of the reproducing system will be described at first. In FIG. 2, the ECC decoder 41 decodes the above-described product code. In this case, a parity of an inner code and a parity of an outer code are not sent. Data for the straight dubbing process is directly sent to the format converter 47 not through the BRR decoder 43. In other words, the output signal of the ECC decoder 41 is not decoded.

The format converter 47 places data in the first half of each horizontal scanning line (each line) so that data is sent to the other VTR with the same interface as the normal picture reproducing system. The format converter 47 adds a CRC code at the end of the data and sends the resultant signal to a coprocessor 151. The coprocessor 151 performs a CRC operation for detecting a transmission error. In addition, the coprocessor 151 multiplexes the compressed picture signal and reproduced audio data received from the audio processor 52. Output data of the coprocessor 151 is sent to a P/S converter 153. An output signal of the P/S converter 153 is obtained from a straight dubbing output terminal 154. The straight dubbing signal has the same format as normal serial data as shown in FIG. 6. The data rate of the straight dubbing signal is 1.485 Gbps. However, the video data has not been decompressed.

The straight dubbing signal is sent to the output terminal 154. In addition, the normal reproduced video data that has been decompressed is sent to the output terminal 54. In this case, only the straight dubbing signal may be output to the output terminal 154.

The serial data that is received from the straight dubbing output terminal 154 of the reproducing digital VTR is sent to the straight dubbing input terminal of the recording digital VTR. In FIG. 1, reference numeral 100 is an input terminal for the straight dubbing process. The input terminal 100 is disposed independent from the input terminal 10 for the normal high resolution video signal.

As with the normal recording process, a signal received from the input terminal 100 is converted into parallel data by an S/P converter 111. The parallel data is sent to a coprocessor 112. The coprocessor 112 separates an audio signal from the parallel data and performs a CRC calculation. An output signal of the coprocessor 112 is sent to the format converter 13. The structure of the recording system downstream of the format converter 13 is shared with the normal recording process. The format converter 13 switches between normal record data received from the input terminal 10 and the straight dubbing data received from the input terminal 100.

When the coprocessor 112 performs the CRC calculation for the straight dubbing data, if a transmission error is detected, information that represents the transmission error is sent to the format converter 13 in the next stage. In this case, the format converter 13 processes the sync error flag in the relevant sync block. When the sync error flag has been set, the format converter 13 does not change the sync error flag. When the sync error flag has not been set, the format converter 13 sets the sync error flag. In other words, the format converters ORes the sync error flag and the detected transmission error and sets a new sync error flag.

Figure 11:
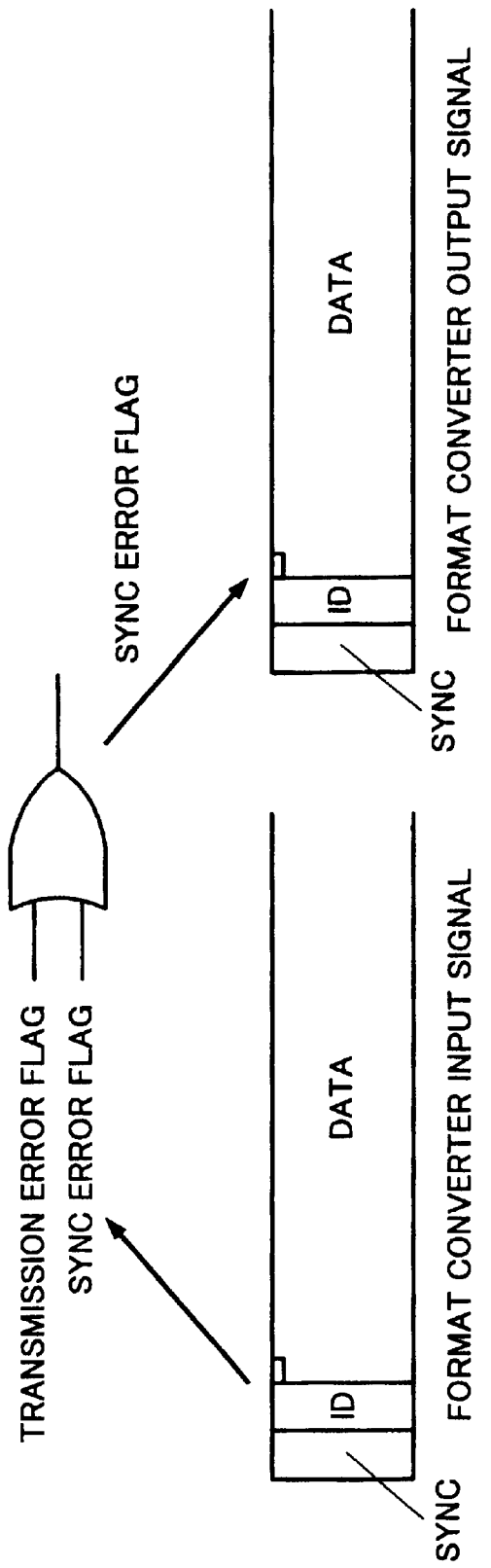
FIG. 11 is a schematic diagram showing a process for a sync error flag in the state that data is recorded in the straight dubbing process.

FIG. 11 shows the process of the error flag performed by the format converter 13 in the recording process. The sync error flag of data that is input from the straight dubbing terminal 100 to the format converter 13 and the error flag (transmission error flag) that has been CRC checked by the coprocessor 112 are ORed and output as a new sync error flag of the data header of an output signal of the format converter 13.

Data that is received from the straight dubbing terminal 100 is a compressed signal (namely, DCT coefficient data). Thus, if the data contains an error, it may affect DCT blocks. To inform the downstream stages of the error of the sync block, the sync error flag is set. In the case that the sync error flag has been set, in the reproducing process, the concealing circuit 45 performs a concealing process so as to prevent a block error of a plurality of pixels from taking place.

An output signal of the format converter 13 is sent to the ECC encoder 22 not through the BRR encoder 18. As with the case that a normal picture signal is recorded, the ECC encoder 22 adds an ID and calculates a product code. Likewise, an output signal of the ECC encoder 22 is sent to recording heads and then recorded to a tape.

Next, focusing on the process of the error flag, the operation of the embodiment of the present invention will be described. Before the straight dubbing process is performed, the normal recording process is performed. Next, recorded data is reproduced. A reproduced signal is obtained from the normal reproduction data output terminal 54 through the ECC decoder 41, the BRR decoder 43, the concealing circuit 45, the format converting circuit 47, the video processor 49, the coprocessor 51, and the P/S converter 53. In addition, a reproduced signal is obtained from the straight dubbing output terminal 154 through the ECC decoder 41, the format converting circuit 47, the coprocessor 151, and the P/S converter 153.

In the normal dubbing process, data obtained from the output terminal 54 is sent to the input terminal 10 of the recording VTR. In the straight dubbing process, data obtained from the output terminal 154 is sent to the input terminal 100 of the recording VTR.

The straight dubbing process is performed by the above-described normal recording process, recoding process, and recording process. In the first normal recording process, the sync error flag SYFLG that is recorded is ('0') that represents no error takes place. In the next reproducing process, corresponding to the result of the error correcting process, the ECC decoder 41 controls the sync error flag SYFLG. In other words, in the case of SYFLG='0', if there is no error, the ECC decoder 41 outputs data containing SYFLG='0' and WFLG='0'. In the case of SYFLG='0', if there is an error that has not been corrected, the ECC decoder 41 sets the sync error flag to '1' and the word error flag WFLG corresponding to the error position to '1'. The ECC decoder 41 outputs data containing SYFLG='1' and WFLG='1'.

The straight dubbing output terminal 154 outputs data containing the sync error flag SYFLG. As was described with reference to FIG. 11, the recording VTR detects an error on a transmission path between the reproducing VTR and the recording VTR with a CRC. When the transmission error flag has been set to '1', the recording VTR sets the sync error flag SYFLG of the relevant sync block to '1' and records data. In this state, the recording VTR records data. When the recording VTR does not detect a transmission error, it records the sync error flag SYFLG='0' or '1'.

As described above, data with the controlled sync error flag SYFLG is recorded in the straight dubbing process. Next, a reproducing process for data that has been recorded in the normal recording process or the straight dubbing process will be described. In the reproducing process, the ECC decoder 41 performs a different process corresponding to the state of the sync error flag SYFLG.

As shown in FIG. 12A, when the sync error flag SYFLG of the reproduced data has not been set, in the output data of the ECC decoder 41, the word error flag WFLG corresponding to a word that has not been corrected has been set. When there is no error or an error has been corrected, the word error flag WFLG is not set. This process takes place when data that has been recorded in the normal recording process is reproduced or data that has been recorded in the straight dubbing process of which the OR output of SYFLG and the transmission error flag is '0' is reproduced.

On the other hand, as shown in FIG. 12B, when data is reproduced, if the sync error flag SYFLG thereof has been set, it is determined that the data has been dubbed once. At this point, the sync error flag SYFLG is kept "1" and the word error flag WFLG of each word of the relevant sync block is set. FIG. 12B shows an example of which the word error flag WFLG has been set corresponding to a word whose error has not been corrected. However, even if the word error flag WFLG has not been set at all, when the sync error flag SYFLG has been set to '1', it represents that there is a word error that has not been corrected. Thus, the word error flag WFLG of each word of the sync block is set. In this case, the word error flags WFLG of all the words of the relevant sync block are set. When the reproduced data is obtained from the straight dubbing terminal 154, the sync error flag is added.

The BRR decoder 43 selects the method of the interpolating process corresponding to the sync error flag SYFLG and the word error flag WFLG. When the sync error flag SYFLG has been set and the word error flag WFLG of only a part of words of the relevant sync block has not been set, the BRR decoder 43 performs the normal expanding process. In other words, the BRR decoder 43 determines an available DCT coefficient corresponding to the word error flag WFLG and decodes data with the determined DCT coefficient.

On the other hand, when the sync error flag SYFLG has been set and the word error flag WFLG has been set in all the words of the relevant sync block, it is determined that a dubbing process has been performed and an error that cannot be located is contained in the relevant sync block. Thus, a relevant flag is sent to the concealing circuit 45 so that it performs the interpolating process.

As described above, when the straight dubbing process is performed, with the sync error flag SYFLG, error information with respect to the tape reproducing process and error information of the transmission path can be sent to the downstream stages. In the normal picture reproducing system, with the sync error flag SYFLG and the word error flag WFLG, the picture decoding process or the interpolating process can be selected.

In the block diagrams shown in FIGS. 1 and 2, each function is represented as for example an error correcting encoder. However, these functions are accomplished by independent ICs. In the above-description, the straight dubbing terminals 100 and 154 handle a serial signal of 1.485 Gbps. However, depending on a compressing rate, a serial interface with a lower rate can be used. Of course, a parallel signal can be handled.

In the above embodiment, an example of which the present invention is applied for the 1125 lines/60 Hz format was descried. However, the present invention is not limited to such a format. For example, the present invention can be applied for the NTSC format of which the field frequency is 59.94 Hz. In this case, each interface frequency and clock signal frequency is divided by 1.001 (=60/59.94).

In addition, the present invention can be applied for a recording/reproducing system for only a video signal.

As described above, according to the present invention, a terminal a compressed signal of which a picture-compressing/expanding process is not performed is disposed. With a special signal format, error information of data that is reproduced from a tape is sent. In addition, error information that takes place on a transmission path is left on the tape. Thus, the straight dubbing process that allows the deterioration of picture quality to be minimum can be performed. In addition, with the straight dubbing terminal, while the normal picture reproducing process is being performed, the straight dubbing process can be performed.

The effects of the present invention are as follows.

When the straight dubbing process is performed, since the compressing/expanding operation is omitted, the deterioration of the picture quality can be minimized.

Information of an error that has not been corrected in the reproducing VTR can be securely sent to the recording VTR.

When an error takes place on a transmission path to the recording VTR, when data thereof is recorded, the error can be located with a flag. Thus, the influence of the error to the picture quality can be suppressed.

With a straight dubbing terminal, the straight dubbing process and the normal dubbing process can be performed at the same time.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A digital information signal recording apparatus for recording a digital information signal to a record medium, comprising:

normal recording means having a first input terminal for receiving a digital information signal at a first data rate (bits per second), a first encoder for performing a compressing process for the digital information signal that is input through said first terminal, and a second encoder for performing an error correction code encoding process for a compressed signal received from said first encoder;

recording means for recording an output signal of said second encoder to a record medium; and straight recording means having a second input terminal for receiving data at said first data rate that has been compressed and processing means for processing the compressed data, wherein the processing performed by the straight recording means is performed concurrently with the processing performed by the normal recording means.

2. The digital information signal recording apparatus as set forth in claim 1, wherein data that is input from said second input terminal contains an error flag for each record/reproduction data block.

3. The digital information signal recording apparatus as set forth in claim 1, wherein data that is input from said second input terminal contains redundant data that is an error detection code for detecting a transmission error.

4. The digital information signal recording apparatus as set forth in claim 1, wherein data that is input from said second input terminal contains an error flag for each record/reproduction data block and redundant data that is an error detection code for detecting a transmission error, wherein a transmission error is detected with the redundant data, and wherein even if the error flag for each record/reproduction data block has not been set, when the transmission error is detected, the error flag for each record/reproduction data block is set and recorded.

* * * * *